July 10, 1923.

H. C. ROSE ET AL 1,461,097

CIRCULAR MILLING MACHINE

Filed Aug. 15, 1921

Patented July 10, 1923.

1,461,097

UNITED STATES PATENT OFFICE.

HOWARD C. ROSE AND ALEXANDER OBERHOFFKEN, OF DETROIT, MICHIGAN, ASSIGNORS TO INGERSOLL MILLING MACHINE COMPANY, OF ROCKFORD, ILLINOIS, A CORPORATION OF ILLINOIS.

CIRCULAR MILLING MACHINE.

Application filed August 15, 1921. Serial No. 492,425.

*To all whom it may concern:*

Be it known that we, HOWARD C. ROSE and ALEXANDER OBERHOFFKEN, citizens of the United States and Germany, respectively, residing at Detroit, in the county of Wayne and State of Michigan, have invented certain new and useful Improvements in Circular Milling Machines, of which the following is a specification.

This invention relates in general to milling machines, and more particularly to the type commercially known as "circular" milling machines, one form upon which our present invention constitutes an improvement being disclosed in application, Serial No. 175,170, filed June 16, 1917.

In the machine disclosed in the above-mentioned application, a rotatable work carrier equipped with a plurality of stationary work supports is designed to rotate beneath and at a different speed from a concentrically mounted tool carrier equipped with a plurality of milling tools so that as a result of differences in speed at which the work carrier and tool carrier are rotated, a relative movement between the work on the supports and the milling tools will be secured so that the work will be surfaced by the tools. In that instance, the relative movement between the work and the tools is in a direction at right angles to vertical planes extending radially of the carriers and intersecting the work and tools.

Since some types of work are not adapted to be conveniently placed on a work carrier in such position that the relative movement between the work and the tools will be transverse to a radius of the revolving carriers, our present invention is designed to provide a machine in which the relative movement between the work and the tools will take place radially of the work carrier, thus permitting certain types of work to be finished for which the other machine above referred to is not adapted.

A further purpose of our invention is to provide a machine of simplified construction, which can be economically manufactured, and which will be efficient in operation, and with this end in view, the tool carrier is fixedly mounted upon and supported by the work carrier so that the two carriers can be rotated as a unit from a single driving mechanism.

Another feature of our invention resides in the fact that all of the loading and unloading of the work is performed at one location, commonly referred to as the "loading station," the work being carried from this station around the machine while the surfacing operations are being performed so that when the work again reaches the loading station, the operations thereon have been completely finished, and the machine so designed that the greater portion of one revolution of the work carrier is available for the milling operation, while a relatively short arc is adequate for loading and unloading purposes.

Other objects and many of the inherent advantages of this invention will be readily appreciated as the same becomes better understood, by reference to the following description when considered in connection with the accompanying drawings.

Referring to the drawings.

Figure 1:
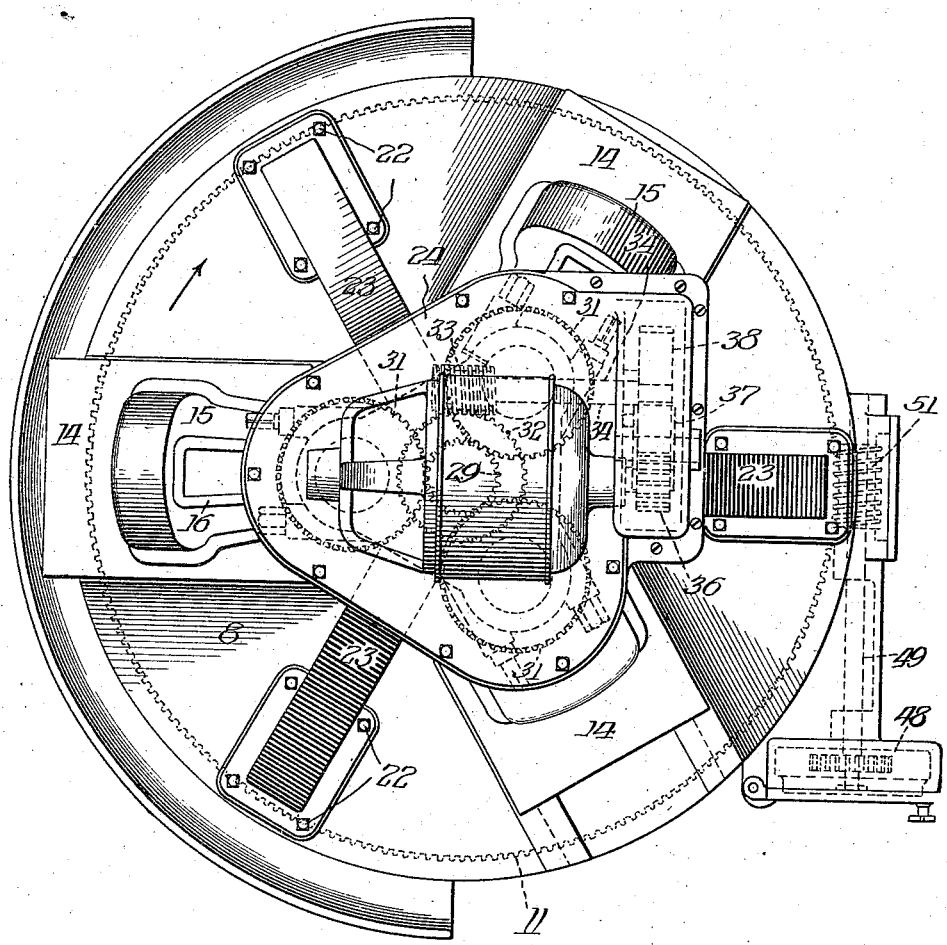
Fig. 1 is a plan view of a milling machine embodying our invention.
Figure 2:
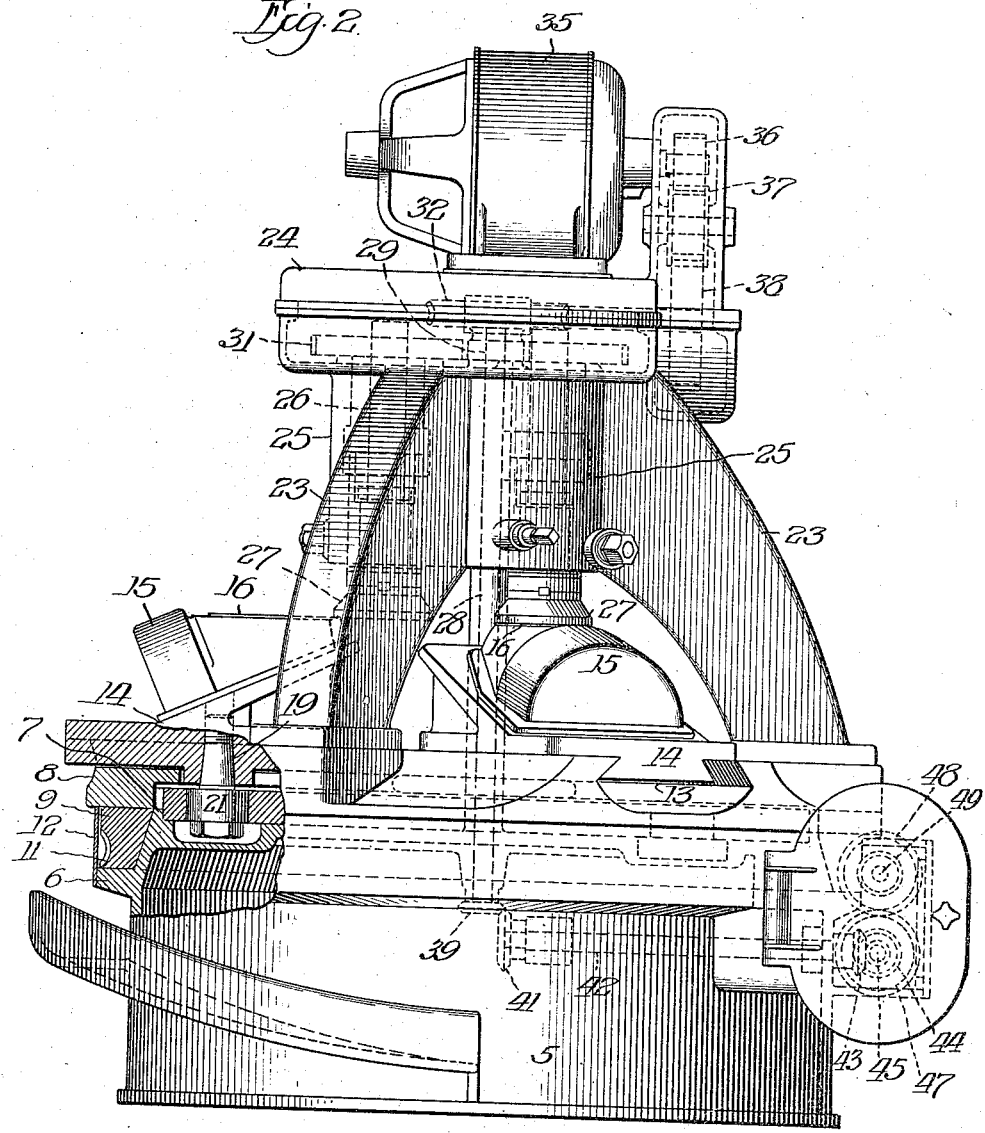
Fig. 2 is a side elevation thereof.

By reference to the drawings, it will be observed that the machine comprises a circular base 5 provided with a circumferential flange or ledge 6, the base above this ledge being of diminished diameter, as indicated by reference character 7, and shaped to accommodate a circular work carrier 8 and an annular depending skirt whereby the carrier is rotatably supported upon the ledge 6. This skirt 9 is provided circumferentially with a worm gear 11, by which the carrier is rotated, as will be later explained, and throughout a greater portion of the circumference of the machine, this worm is enclosed in a housing 12 for purposes of protection.

The work carrier 8 comprises a flat top overlying the base of the machine and provided with a plurality of (in the present instance for purposes of illustration three) radially disposed guideways 13 in each of which there is reciprocably mounted a work support 14 adapted to reciprocate on the carrier in a horizontal plane. The work supports themselves may be of any preferred shape and dimensions adapted to accommodate and carry the particular objects or articles to be operated upon, and in the present instance, the upper faces of the supports are shown as inclined to adapt them for crank cases 15, which are shown, as illustrative of the work which may be operated upon in such a machine. In this instance, the flat surfaces 16 are the ones to be milled and finished by the machine.

Figure 3:
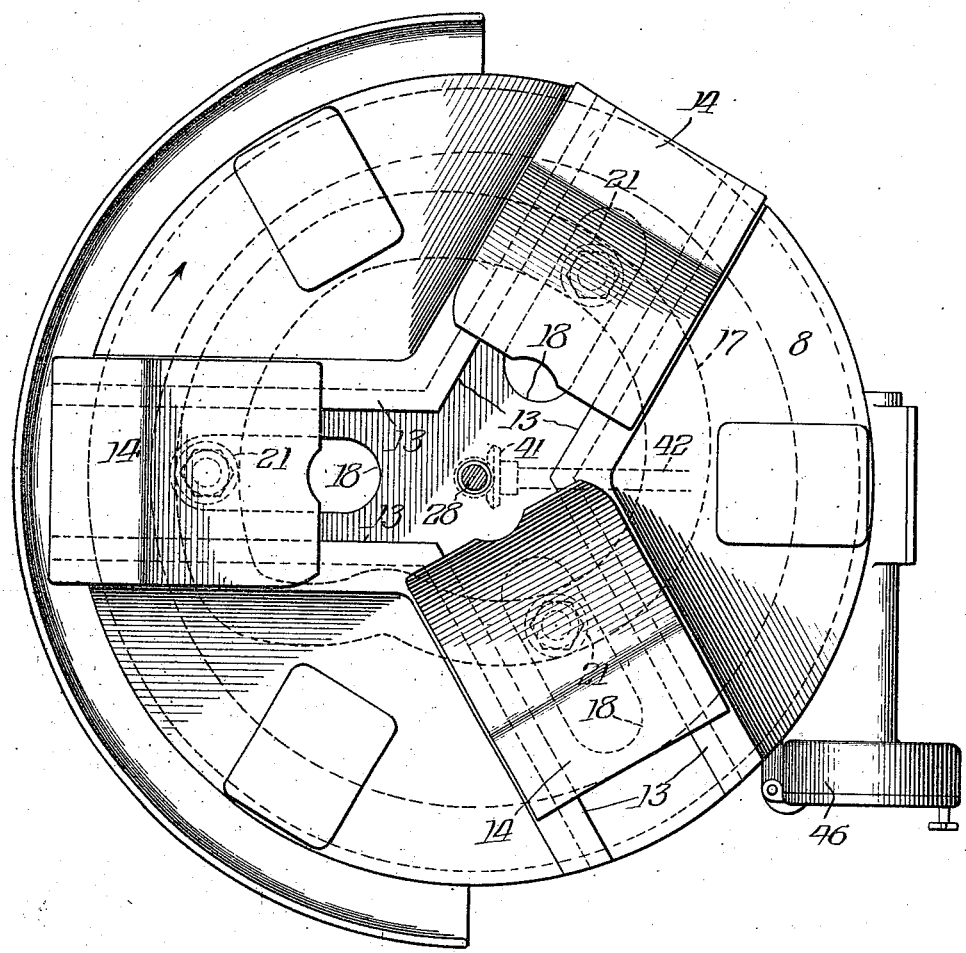
Fig. 3 is a plan view with the spindle carrier standard and parts mounted thereon removed.

Upon the base 5 of the machine and beneath the work carrier 8, there is disposed a stationary cam provided with a cam groove 17, best shown in Fig. 3, and above this cam, the work carrier is provided beneath each work support with a radially disposed slot 18, through which extends a stub shaft 19 provided with a roller or follower 21 which travels in the cam groove. It will be manifest that as the work carrier revolves, the work supports will be reciprocated radially of the carrier as they are moved around the machine, and the cam groove is shaped to provide for one complete reciprocation of each work support to each revolution of the machine.

Upon the work carrier and fixedly secured thereto by bolts 22 or other fastening means, there is mounted a standard of tripod shape, comprising the three legs 23 spaced intermediately between the work supports, and the upper end of this standard provides a tool carrier in the form of a head 24 from which depend the sockets or bearings 25 in which the tool spindle 26 carrying at their lower ends the milling tools 27, are rotatably mounted. The tools themselves are disposed over and in radial alignment with the work supports so that as the supports are reciprocated radially of the carrier, the work thereon is moved beneath and in cooperative relation to the tools whereby the work is operated upon.

Centrally of the standard, there is mounted a vertically disposed shaft 28 provided within the head 24 with a pinion 29, which meshes with and drives the pinions 31, each of which is fixed to the upper end of one of the tool spindles 26, and whereby these spindles are rotated. The shaft 28 is also provided within the head 24 above the pinion 29 with a worm wheel 32, through which rotary movement is imparted to the shaft 28 from the worm 33 mounted upon the inner end of a shaft 34.

Power is supplied to the machine from a motor 35 mounted upon the top of the head 24, and this motor drives the shaft 34 through a train of gearing consisting of the pinion 36, an idler 37, and a gear 38 mounted upon the outer end of the shaft 34. Through this connecting train, rotary movement is imparted to the shaft 28 and from this shaft to the tool spindles, to actuate the tools 27.

Rotary movement is also imparted to the work carrier and the standard and tool carrier supported thereon from the shaft 28 through a train of mechanism consisting of a beveled gear 39 on the lower end of the shaft 28 within the base 5, a beveled gear 41 meshing therewith and mounted on a radially disposed shaft 42, the outer end of which is equipped with a beveled gear 43 meshing with and driving a beveled gear 44 on the inner end of a countershaft 45, this shaft being disposed tangentially to the work carrier, and equipped at its outer end within the gear box 46 with a spur gear 47, which meshes with a companion gear 48 on a shaft 49, which is equipped with a worm 51 (Fig. 1) meshing with and driving the worm wheel 11 on the periphery of the work carrier. By replacing the gears 47 and 48 with gears of different diameters, the rotational speed of the work carrier may be varied, as desired.

In the operation of the machine, the work carrier and parts carried thereby are continuously rotated, and the tools are continuously revolved. That side of the machine at the left, viewing the figures of the drawings, is known as the "loading station", and from an inspection of Fig. 3, it will be apparent that at this side of the work support the work is at its extreme outer position so that the finished piece of work on the support may be removed and replaced by another. The work in this position of the support is disposed radially outwardly beyond the milling tool, and the cam 17 is so designed that approximately 90° of dwell is provided, affording ample time for unloading and re-loading the work support before inward movement of the support begins. As the work carrier continues its revolution in a clockwise direction, viewing Fig. 3, the work support is moved radially inwardly by the cam 17 to move the work beneath the superposed tool 27, and this inward movement continues throughout an arc of approximately 240°, at which point the work support has reached its innermost position and the work has been completely traversed by the tool. The cam is then shaped to provide a quick return or outward radial movement of the support, which return takes place while the carrier is traveling through an arc of approximately 30°, thus returning the work to a position outwardly beyond the tool by the time the loading station is reached, so that the now finished piece of work may be removed and replaced by another piece to be operated upon.

It will be apparent therefore, that the operator stands at the loading station and unloads and reloads the work supports as they are successively presented to him, and while he is unloading and reloading one work support, the work on the other supports will be operated upon by the respective tools. A continuously operating machine is therefore provided, in which the work and the tools are continuously rotated about a common axis, and during the rotation of the carrier, the work is traversed by the tool in a direction radially of the carrier; this relative movement between the work and tool being most desirable for some classes of work, as has been previously pointed out. It should be apparent that while three work supports and three tools are disclosed in the present instance, this number may be increased if the character of the work is such that the operator can unload and re-load more than three pieces at each revolution of the machine.

It is believed that our invention, its construction and mode of operation will be understood from the foregoing without further description, and while we have shown and described a preferred embodiment of the invention, obviously its details of construction may be varied within wide limits without departing from the spirit of the invention, as defined in the following claims.

We claim:

1. In a circular milling machine, the combination of a rotatable work carrier, a tool carrier immovable relatively to said work carrier, means for rotating said carriers as a unit, and means for causing a relative movement between the work and the tools carried by said respective carriers, during the rotation thereof, said means comprising work supports slidably mounted on said work carrier and means for reciprocating said supports transversely of the axes of said tools.

2. In a circular milling machine, the combination of a rotatable work carrier, a tool carrier mounted to rotate therewith, an equal number of work supports and tools mounted on said work and tool carriers respectively, and means for causing a relative movement between each work support and its tool during the rotation of said carriers, said means including mechanism for reciprocating each work support on its work carrier across the axial line of said tool.

3. In a circular milling machine, the combination of a rotatable work carrier, a tool carrier rotatable with and at the same speed as the work carrier, rotatable tools and non-rotatable work supports carried by said carriers respectively, and means for causing a relative movement between each work support and its corresponding tool radially of the work carrier during the rotation of said carriers.

4. In a circular milling machine, the combination of a rotatable work carrier, a tool carrier connected with said work carrier to rotate therewith, a reciprocatory, non-rotatable work support and a tool carried respectively by the carriers, and means for causing a relative movement between said work support and said tool radially of said carriers during the rotation thereof.

5. In a circular milling machine, the combination of a rotatable work carrier, a tool carrier connected thereto to rotate therewith, a plurality of work supports movably mounted on said work carrier, a corresponding number of tools mounted on said tool carrier, and means for moving said work supports radially of the carrier beneath their respective tools during the rotation of said carriers to subject the work on said supports to the action of said tools.

6. In a circular milling machine, the combination of a rotatable work carrier, a tool carrier fixedly mounted thereon, a plurality of work supports mounted on said work carrier, a tool mounted in said tool carrier above each work support, and means for moving each work support toward and from the axis of rotation of said carriers as said carriers are rotated.

7. In a circular milling machine, the combination of a rotatable work carrier, a plurality of work supports slidably mounted thereon, a tool carrier disposed concentrically with respect to said work carrier, a plurality of tools mounted in said tool carrier above said work supports, and means for moving each work support relatively to its respective tool radially of said work carrier during the rotation thereof.

8. In a circular milling machine, the combination of a rotatable work carrier, a plurality of work supports slidably mounted thereon, a standard fixedly mounted upon said carrier, a tool carrier mounted upon said standard, a plurality of tools carried by said tool carrier, and a stationary cam for moving said work supports radially of the work carrier during the rotation of said carrier.

9. In a circular milling machine, the combination of a rotatable work carrier, a standard fixedly mounted thereon, a tool carrier mounted upon said standard to rotate with said work carrier, a plurality of tools mounted in said tool carrier, a work support slidably mounted upon said work carrier beneath each tool, a stationary cam disposed beneath the work carrier, and operative connections beneath each work support and said cam whereby said work supports are reciprocated radially of said work carrier during a revolution of said carrier.

10. In a circular milling machine, the combination of a rotatable work carrier, a plurality of work supports carried thereby, a tool disposed above each work support and mounted to rotate with said carrier, and means for reciprocating said work supports beneath their respective tools as said work carrier is rotated.

11. In a circular milling machine, the combination of a rotatable work carrier, a plurality of work supports carried thereby, a tool carrier, a tool mounted in said carrier above each work support, said work supports being disposed at the loading station of said machine radially outwardly beyond their respective tools, and means for moving said work supports radially inwardly beneath their respective tools during a major portion of a revolution of said carrier and for returning said supports to their normal outer position at said loading station.

12. In a circular milling machine, the combination of concentrically mounted, rotatable work and tool carriers, a plurality of tools carried by said tool-carrier, a plurality of guideways formed on said work-carrier, a work support slidably mounted in each guideway, means for rotating said carriers, and means for reciprocating said work supports in their respective guideways across the axial lines of their respective tools during the rotation of said carriers.

13. In a circular milling machine, the combination of a rotatable tool-carrier, a plurality of tools supported thereby, a rotatable work-carrier mounted concentrically with said tool carrier and provided with a plurality of guideways, a work support slidably mounted in each guideway, means for simultaneously rotating said carriers, and means including a stationary cam beneath said work-carrier for reciprocating said work supports during the rotation of said carriers.

HOWARD C. ROSE.
ALEXANDER OBERHOFFKEN.